Figure 1:
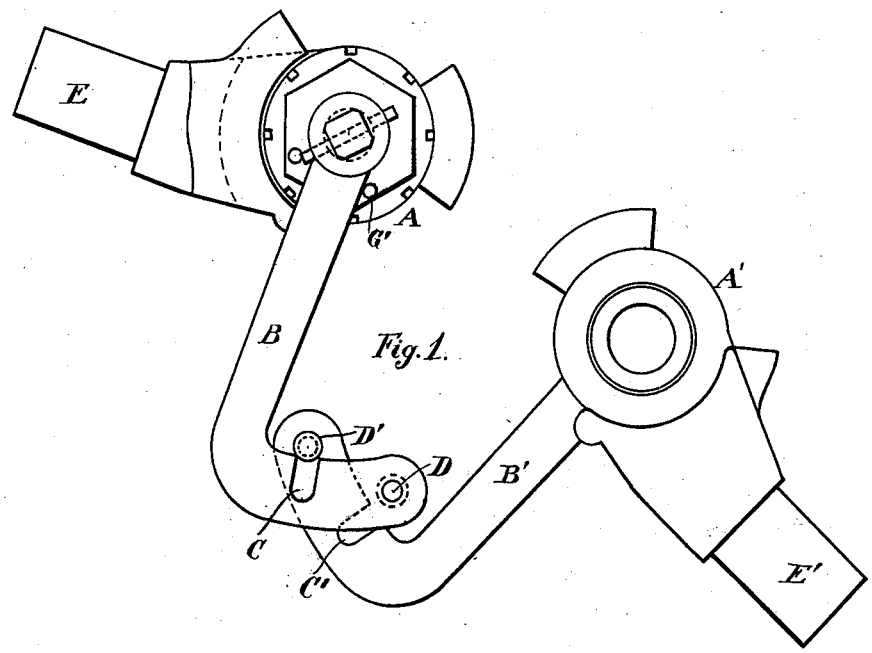

(No Model.) 2 Sheets—Sheet 1.

J. H. PORTER & E. A. GROSVENOR.
SELF-LOCKING AUTOMATIC DEVICE FOR OPENING AND CLOSING VALVES TO AIR BRAKE HOSE COUPLINGS.

No. 385,959. Patented July 10, 1888.

Witnesses.
Carroll J. Webster.
Alonzo Noteman.

Inventors.
John Harrison Porter.
Edgar A. Grosvenor.
By William Webster.
Atty.

(No Model.) 2 Sheets—Sheet 2.

J. H. PORTER & E. A. GROSVENOR.
SELF LOCKING AUTOMATIC DEVICE FOR OPENING AND CLOSING VALVES TO AIR BRAKE HOSE COUPLINGS.

No. 385,959. Patented July 10, 1888.

Witnesses.
Carroll J. Webster.
Alonzo Noteman.

Inventors.
John Harrison Porter.
Edgar A. Grosvenor.
By William Webster.
Atty.

UNITED STATES PATENT OFFICE.

JOHN HARRISON PORTER, OF JACKSON, AND EDGAR A. GROSVENOR, OF DETROIT, MICHIGAN.

SELF-LOCKING AUTOMATIC DEVICE FOR OPENING AND CLOSING VALVES TO AIR-BRAKE-HOSE COUPLINGS.

SPECIFICATION forming part of Letters Patent No. 385,959, dated July 10, 1888.

Application filed October 10, 1887. Serial No. 251,904. (No model.)

*To all whom it may concern:*

Be it known that we, JOHN HARRISON PORTER and EDGAR A. GROSVENOR, citizens of the United States, of Jackson and Detroit, respectively, in the counties of Jackson and Wayne, respectively, and State of Michigan, have invented certain new and useful Improvements in a Self-Locking Automatic Device for Opening and Closing Valves to Air-Brake-Hose Couplings; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to a self-locking automatic device for opening and closing valves to air-brake-hose couplings, and has for its objects to provide means whereby the act of uniting the two sections of coupling shall automatically open valves within the same, thereby establishing an uninterrupted passage for the air through the coupling and pipes or hose connected therewith, and at the same time and by the same act lock the valves in this relation or close the same when uncoupling the sections.

With the coupling of ordinary use in the present air-brake system it is necessary to employ a cock in the hose or pipe, and at some distance from the coupling, to admit or cut off the flow of air. This necessitates time and inconvenience on the part of the employé intrusted with this duty, as it is necessary to get beneath the platform to be within reach of the cock, and there being one on each end of the car it requires the employé coupling the same to get beneath each platform of the cars being coupled. There is danger of the employé forgetting or neglecting to open the cocks, thereby rendering the brakes of such cars as may be in rear thereof inoperative by reason of the air being cut off therefrom. Another and still greater danger is from interference with these cocks by unauthorized persons either with or without malicious premeditation, as in the case of tramps "stealing rides" and lurking beneath the platform to avoid detection.

By our invention the inconvenience and danger above alluded to are avoided, for open communication between the hose on adjoining cars is established by the simple act of bringing the sections of the coupling together and interlocking them by a partial revolution, this partial revolution of the sections uncovering the ports in the valves and causing arms attached to the valves to interlock, and thus prevent the latter from turning. A reverse movement of the sections uncouples the pipes and closes the valves in the coupling to prevent the escape of air.

Our invention consists in certain details of construction and combination of parts, which will first be described in connection with the accompanying drawings and then pointed out in the claims.

We attain these objects by the mechanical arrangement shown in the drawings, in which—

Figure 2:
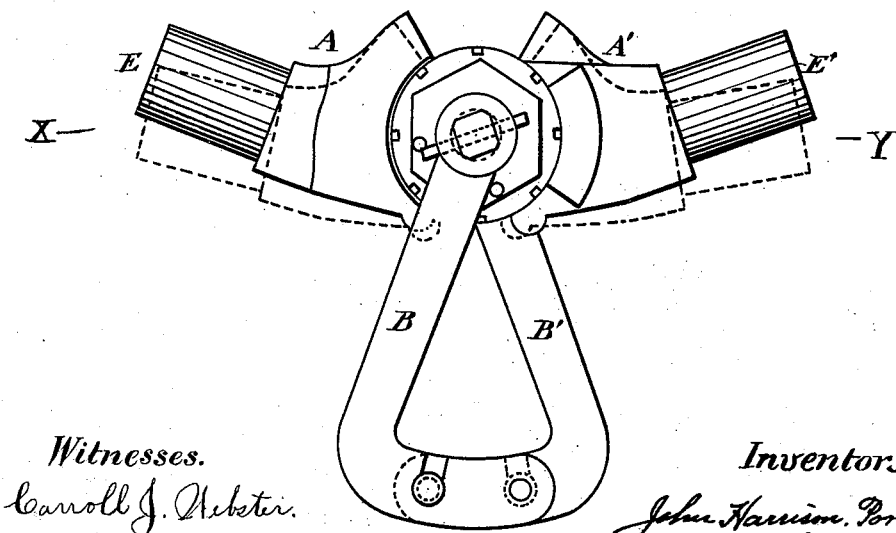
Figure 3:
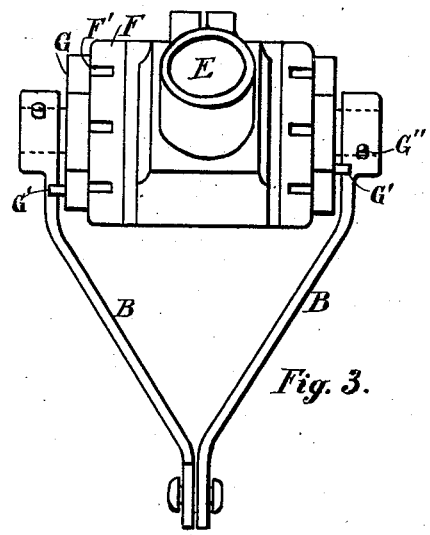
Figure 4:
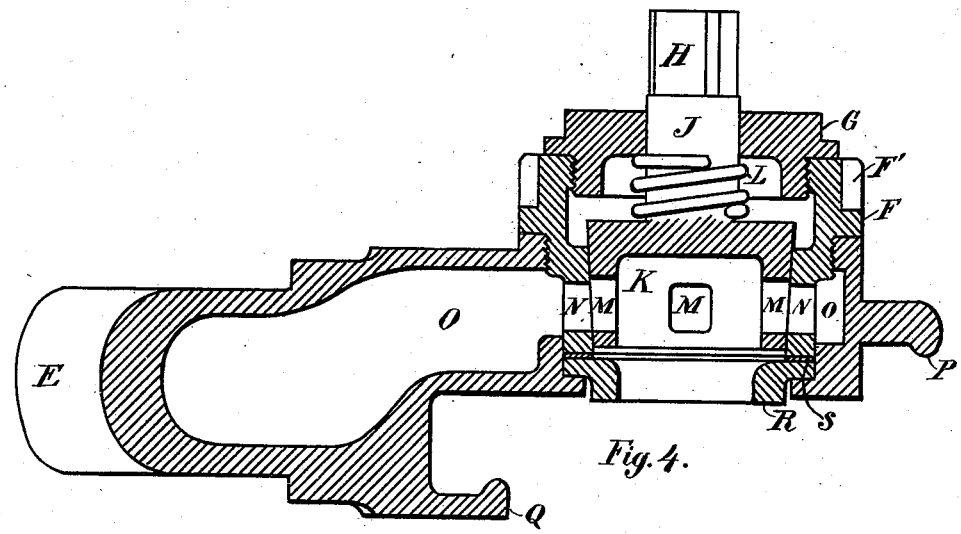

Figure 1 is a perspective view of two sections of a coupling as in the act of being coupled, the locking-arms being in position to engage with their respective fastenings. Fig. 2 is a like view showing the parts coupled and the arms interlocked, showing also in dotted lines X Y the position the two sections of coupling assume when in the act of uncoupling. Fig. 3 is an end view of the couplings inserted, and Fig. 4 is a longitudinal sectional view of one of the coupling-sections.

Like letters of reference indicate like parts.

A and A' represent the two sections of the coupling, each of which is formed with the two catches Q and P, by which they are united and held in coupled relation.

E and E' designate the hose, this being the usual construction, and, having no reference to our invention, needs no further description.

Each section of coupling is formed with a screw-threaded perforation, into which is inserted a screw-threaded cylindrical valve-seat, F, having perforations N, preferably four, which communicate with the air-space O within the coupling-section. The valve-seat is securely screwed in place by means of a spanner engaging within space F' on its outer periphery, or it may be formed for the ordinary wrench, if desired. The inner face of the valve-seat is slightly inclined, as shown, its upper side being threaded internally to receive a threaded nut, G, which may be formed with a hexagonal top, as shown, or with spaces F', corresponding to those in the valve seat.

K is a valve fitting closely within the inclined valve-seat, and is provided with ports M, corresponding in number to those in the valve-seat. This valve has a stem, J, having a squared end, H, and is held to its seat by a coiled spring, L, encircling the stem and bearing against the upper side of the valve and lower side of nut G.

B and B' are interlocking arms. As these arms are similar in construction, a description of one will answer for either. There is at the upper end a squared perforation adapted to fit over the squared part H of the valve-stem and be held in place by a transverse pin or key, G'', as shown in Figs. 1, 2, and 3. From this point the arm extends downwardly in an inclined direction for a short distance, and is then bent at an acute angle thereto and terminates a short distance therefrom.

The lower horizontal portion of each locking-arm A and A' is formed with slots C and C' and provided with studs D and D', respectively, the studs being upon the outer end and the slots within the inner portion of each, thereby making the levers interchangeable and adapting them to interlock one with the other irrespective of the end of the car that may be presented.

The end nuts, G, of each section have pins or studs G', between which the levers of each end are placed, the said pin limiting the rotative movement of the sections when being coupled, and, as will presently appear, the rotative movement of the valve.

S is a metal washer, onto which the valve-seat rests, the washers bearing upon a rubber gasket, R, whereby an air-tight fitting is made by screwing the parts firmly to place.

When it is desired to couple the sections together, the act of placing the two sections in their positions brings the arms B and B' into engagement, as shown in Fig. 1, the studs D' of arm B' entering slot C of arm B, and the stud D of arm B entering slot C' of arm B'. The two sections A and A' are then joined, as shown in dotted lines, Fig. 2, in which position valves K in each section are closed by the section being turned one-eighth their circumference, causing the intermediate spaces between the ports M to cover the ports N in the valve-seat F. The two sections A and A' are now brought to a full lock, thereby assuming the position shown in full lines, Fig. 2, the interlocking arms B and B' remaining stationary and holding the valves K from turning. The sections A and A' by their movement in assuming their coupled position uncover the ports N and establish communication between the sections, and as a consequence air passes freely through hose E, opening O in section A, ports N and M, and through the space formed by gasket R into the corresponding parts of section A' and into hose E'. When it is desired to uncouple the hose between cars, the sections are brought to a position shown in dotted lines, Fig. 2, which moves the valve-seats one-eighth their circumference, thereby covering ports M, (the valves K being held from turning by arms B B'.) The sections are then separated, as shown in Fig. 1, the arms disengaged, and the parts are uncoupled, with the ports closed to prevent the escape of air; but should the train break apart and the sections be uncoupled by a straight pull the levers will unlock and allow the valves to remain open and the brakes to set upon the detached part of the train. It will be seen that studs G' limit the movement of the sections to the desired one-eighth turn, which is just sufficient to open or close the ports.

By the arrangement of gasket G, washer S, and the screw-threaded valve-seat F, as well as the screw-threaded nut G and spring L, any wear upon either of the parts can be compensated for by the adjustment afforded.

While our invention is especially adapted to use in the system of air-brakes wherein the brakes are set by air under pressure, it is equally well adapted for the vacuum system, as the interlocked arms prevent the sections from pushing apart. It will also be understood that our improvements are equally well adapted for steam or hydraulic couplings.

Having described our invention, what we claim, and desire to secure by Letters Patent, is—

1. In a hose-coupling, two movable interlocking sections, a ported valve within each section, and interlocking arms attached to the valves outside the valve-case for preventing rotation of the valves while the sections are being turned upon them to open or close the ports, all combined substantially as described.

2. In a hose-coupling, two movable interlocking sections, a spring-pressed ported valve within each section, and interlocking arms attached to the valves outside the valve-case for preventing rotation of the valves while the sections are being turned upon them to open or close the ports, all combined substantially as described.

3. In a hose-coupling, two movable interlocking sections each provided with a ported inclined valve-seat, a ported valve within each section, and interlocking arms attached to the valves outside the valve-case for preventing rotation of the valves while the sections are being turned to open or close the ports, all combined substantially as described.

4. In a hose coupling, two movable interlocking sections each provided with an inclined removable ported valve-seat, a ported valve within each section, and interlocking arms attached to the valves outside the valve-case for preventing rotation of the valves while the sections are being turned to open or close the ports, all combined substantially as described.

5. In a hose-coupling, two movable interlocking sections each provided with an inclined removable ported valve-seat, a ported valve within each section, and interlocking arms for preventing the rotation of the valves while the sections are being turned to open or close the ports, one end of each arm being secured to the stem of the valve and the other end bent at an acute angle and slotted and provided with a laterally-extending pin, all combined substantially as described.

In testimony that we claim the foregoing as our own we hereby affix our signatures in presence of two witnesses.

JOHN HARRISON PORTER.
EDGAR A. GROSVENOR.

Witnesses for Porter:
  JNO. W. BARRY,
  PAT. RILEY.
Witnesses for Grosvenor:
  GEO. W. CORNS,
  P. O'NEIL.